United States Patent [19]

Yamashita et al.

[11] Patent Number: 4,933,760
[45] Date of Patent: Jun. 12, 1990

[54] MOVEMENT DETECTING CIRCUIT

[75] Inventors: Shinji Yamashita; Masao Uehara; Masahide Kanno; Masahiko Sasaki; Akinobu Uchikubo, all of Hachioji; Jun Hasegawa, Hino; Takehiro Nakagawa, Hachioji; Katsuyoshi Sasagawa, Hachioji; Katsuyuki Saito, Hachioji, all of Japan

[73] Assignee: Olympus Optical Co., Ltd., Tokyo, Japan

[21] Appl. No.: 388,108

[22] Filed: Aug. 1, 1989

[30] Foreign Application Priority Data

Oct. 27, 1988 [JP] Japan ................................. 63-272830

[51] Int. Cl.$^5$ ............................................. H04N 7/18
[52] U.S. Cl. ......................................... 358/105; 358/98
[58] Field of Search .................................... 358/98, 105

[56] References Cited

U.S. PATENT DOCUMENTS 4,730,217 3/1988 Tonge ................................... 358/105
4,779,131 10/1988 Matsumoto et al. .
4,868,650 9/1989 Weckenbrock ..................... 358/105
4,875,094 10/1989 Haghiri .............................. 358/105

Primary Examiner—Howard W. Britton
Attorney, Agent, or Firm—Armstrong, Nikaido, Marmelstein, Kubovcik & Murray

[57] ABSTRACT

The movement detecting circuit of this invention has a band detecting circuit for detecting the signal components of a plurality of image signals. The output signal of this band detecting circuit is input into a band varying circuit for varying the band characteristics of the image signals. The plural image signals having had the band characteristics varied in the band varying circuit are input into a difference signal producing circuit which produces a difference signal of pixel signals approaching respective plural image signals representing the images of an object imaged at different times. A correlation amount between the corresponding plural difference signals produced by the difference signal producing circuit is detected in a correlation detecting circuit. The signal output detected in the correlation detecting circuit is quantified in a quantifying circuit.

10 Claims, 12 Drawing Sheets $$g(t) = \int_0^t f(\tau)h(t-\tau)d\tau$$

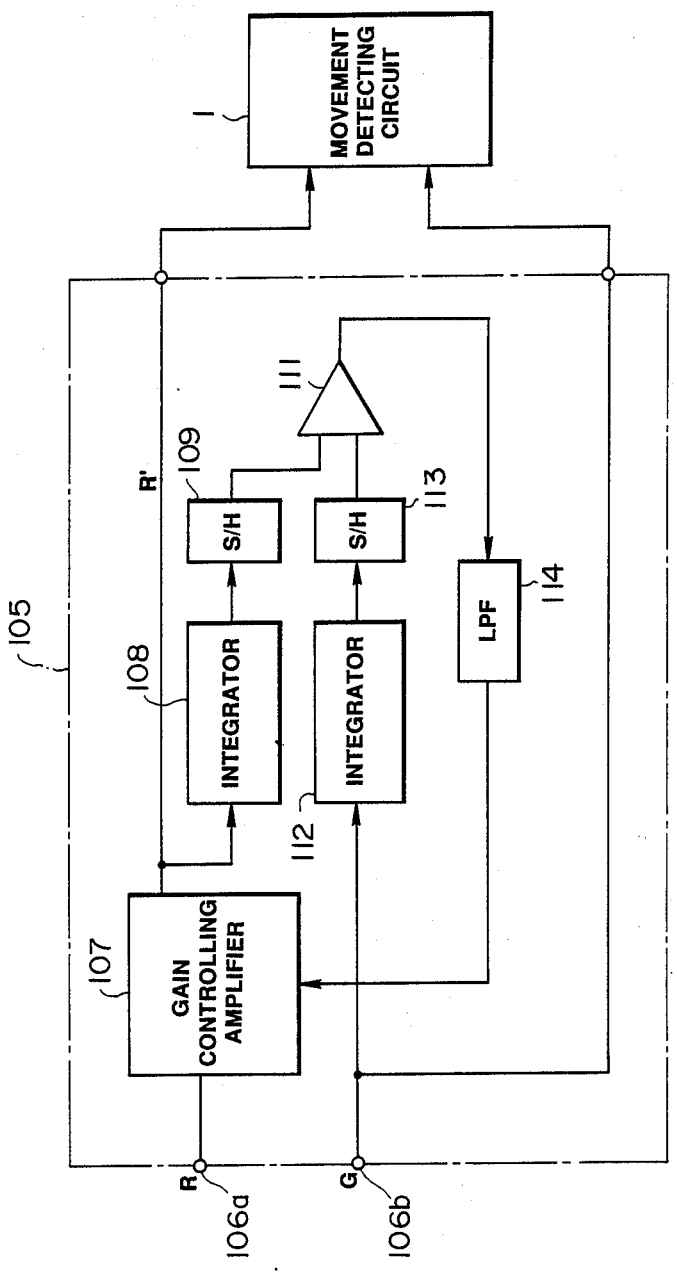

MOVEMENT DETECTING CIRCUIT

Field and Background of the Invention:

This invention relates to a movement detecting circuit for detecting the degree of a movement between image signals representing images.

Generally the movements of images within such picture as of television images are largely divided into the movements within images and the uniform movements of entire images by the parallel movement of the camera. In the case of transmitting, for example, such image, in order to efficiently utilize the transmitting path, the image band is compressed. The part having a local movement of an object within an image is processed as a movement region and the movement in one direction of the entire image is processed as a still region by detecting a movement vector. The band is compressed stronger in the movement region than in the still region in the transmission. Under such background, numerous movement detecting circuits have been devised and utilized.

However, in some case, depending on the uses of the imaging apparatus, the size of the movement quantity may be positively detected without distinguishing the local movement of the image and the movement in one direction of the entire image from each other. For such uses, there are not only a crime preventing apparatus, adapted Y/C separating apparatus and sequential scanning converting apparatus but also an electronic endoscope apparatus used in a medical instrument and displaying an image having as little image movement and color movement as possible as a still picture output.

Recently, with the progress of the solid state imaging device producing technique, the pixels have become so high in the density and the chips have become so small that an endoscope fitted with a solid state imaging device in the tip part or a so-called electronic endoscope apparatus has been developed. Such apparatus has a function of being inserted into a body cavity to observe an inspected part and to record the observed image of the part. Not only the observing capacity but also the quality of the recorded image is so important as to greatly influence the diagnosis of the inspected part. Therefore, in recording, the endoscope operator has stilled patient, has frozen and displayed the image of the inspected part several times, has selected the most desirable picture as a record image and has thus recorded a still image in a monitor image photographing apparatus, video printer or still video floppy apparatus. However, even if the patient is stilled, so long as the living body interior is being observed, the inspected part will move not a little. In order to eliminate the image movement caused by such object movement, the image will have to be frozen several times in some case.

The deterioration of the recorded image by such movement of the object as is mentioned above is different in the generating form in response to the kind of the imaging device and the, imaging system. For example, in case a CCD of a frame transfer type is used as an imaging device, the movement of the object during the exposure period will be produced as a movement of the image. Also, in case a jump scanning is made by using a CCD of an interline type, in addition to the movement of the image caused by the movement of the object during the exposure period, a flicker will be produced by the difference of the image between the fields. In a so-called color frame sequential system wherein an endoscope is fitted with a monochromatic CCD in the tip part so as to be made small in the diameter and the illuminating light is made, for example, R, G and B sequential lights, as the respective time-serially sequentially imaged R, G and B primary color images are synchronized and displayed, a so-called color movement in which the movement of the object is displayed as a color movement will be a problem.

In order to cope with such problem as is mentioned above, there is such movement detecting circuit 1 as is shown, for example, in FIG. 1.

In the detecting circuit 1 shown in FIG. 1, coding means 3a, 3b and 3c provided respectively with input ends 2a, 2b and 2c to which synchronized R, G and B signals are respectively applied n-value, code and output pixel difference signals of respective input signals. The respective n-valued output signals are conceptionally considered to be made by approximating differential outputs of input signals with n kinds of direction vectors. Therefore, if the respective input signals R, G and B are correlated, the direction vectors of the respective signals will coincide or will be similar but, if they are not correlated, the direction vectors will not coincide or will not be similar. Therefore, the respective signals are compared with the above mentioned coded output signals by a comparing means 4 and are further quantified by a quantifying means 5 so that the size of the movement quantity may be detected and a movement detecting signal 9 may be output from an output end 8.

According to this technique, the size of the movement can be detected at a considerable precision in the frame sequential imaging system and simultaneous type imaging system but, in some case, the frame sequential imaging system has been somewhat lower in the precesion.

To explain this point particularly, for example, in a color frame sequential imaging system in which the illuminating light is made R, G and B sequential lights, respective primary color images are obtained time-serially as R0, G0, B0, R1, G1, B1, ... ... Rn, Gn, Bn, ... .... Here, in case the images to have the movement detected are set to be Gn and Gn+1, the difference of the signals included in the images of Gn and Gn+1 will be predominantly by the movement and the formation of the movement detecting circuit in FIG. 1 will be sufficient. However, here is a problem in the manner of selecting the images to have the movement detected. Even if it is detected that the movement quantity is small between Gn and Gn+1, the movement quantity will not be always small among Gn, Bn, Rn+1 and Gn+1. In the R, G and B color frame sequential imaging system, in the movement detection for obtaining a still picture having little ,color movement, the movement of a series of R, G and B sequential images must be detected. In such case, the images to have the movement detected are considered to be any combination of Rn, Gn and Bn but the difference of the signals included in the respective images will be not only by the movement but also by such elements as the thickness values and bands of the respective primary color images inherently by the object.

In order to detect the movement included in the image, it is a basis to determine the correlation of the informations included in the images to be detected. Therefore, in the case of the color frame sequential imaging system, it will be desirable to exclude the other differences than the variation by the movement.

According to FIG. 1, as the correlation is determined on the basis of a differential signal of the image, the error by the thickness value of the image will be reduced but, as the bands of the respective sequential signals are not positively made to coincide, the non-coincidence of the bands will be left as an error factor.

Object and Summary of the Invention:

An object of the present invention is to provide a movement detecting circuit of a simple formation wherein the size of a movement can be detected at a high precision without depending on the object in a color sequential imaging system.

The movement detecting circuit according to the present invention comprises:

a difference signal producing circuit for producing a difference signal of pixel signals approaching respective plural image signals representing images of an object imaged at different times;

a correlation detecting circuit for detecting the correlation between the corresponding plural difference signals produced by the difference signal producing circuit;

a quantifying circuit for quantifying the signal output detected by the correlation detecting circuit;

a band detecting circuit for detecting the signal components of the plural image signals; and a band varying circuit for varying the band characteristics of the image signals input into the difference signal producing circuit by the output signal of the band detecting circuit.

Brief Description of the Drawings:

FIGS. 2 to 11 relate to the first embodiment of the present invention.

FIG. 2 is a fundamental formation diagram.

FIG. 3 is a formation diagram of a coding means.

FIG. 4 is a formation diagram of a band detecting means.

FIG. 5 is a formation diagram of a band limiting means.

FIG. 7 is a formation diagram of a difference n-valuing means.

FIG. 8 is a formation diagram of a comparing means.

FIG. 9 is an operation explaining diagram of the comparing means.

FIG. 10 is a formation diagram of a quantifying means.

FIG. 11 is an explanatory diagram showing detection characteristics.

FIG. 20 is a formation diagram of an amplitude adjusting circuit.

Detailed Description of the Preferred Embodiments of the Invention:

The present invention shall be concretely explained in the following with reference to the drawings.

FIGS. 2 to 11 show the first embodiment of the present invention.

Figure 1:
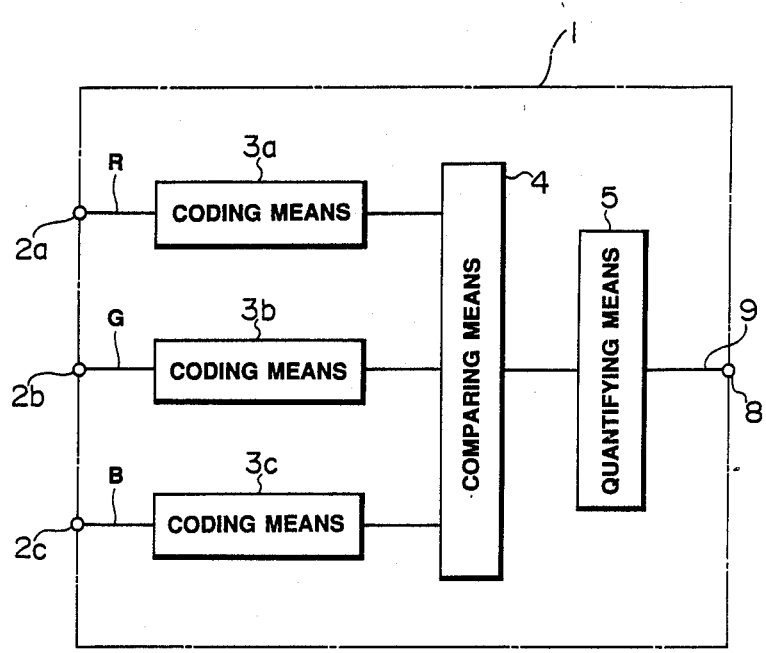
FIG. 1 relates to a related art and is a fundamental formation diagram of a movement detecting circuit.
Figure 2:
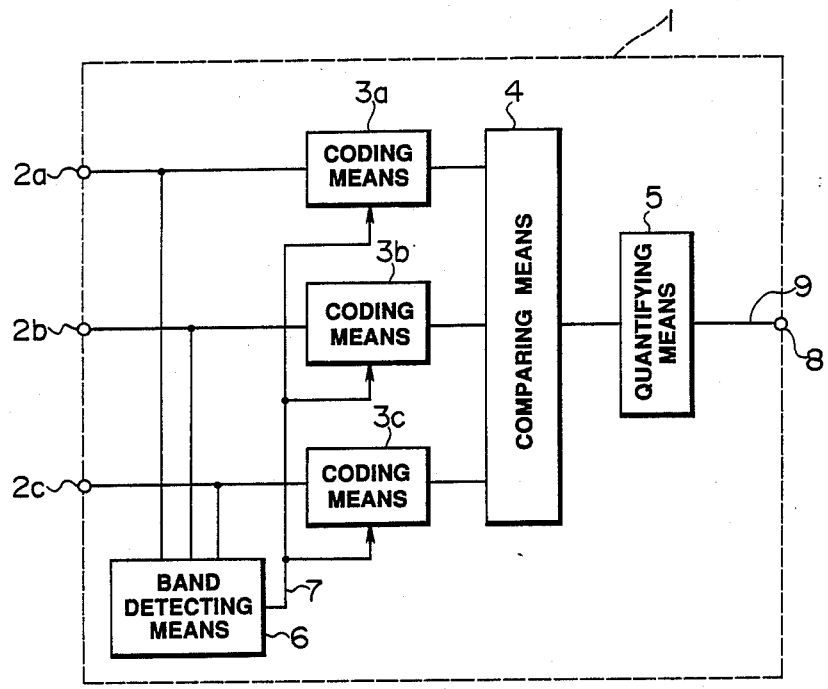

As shown in FIG. 2, in the movement detecting circuit 1 of the first embodiment, coding means 3a, 3b and 3c provided respectively with input ends 2a, 2b and 2c to which synchronized R, G and B signals are respectively applied respectively n-value, code and output the pixel difference signals of input signals. The respective n-valued output signals are conceptionally considered to be made by approximating the differential outputs of the input signals with n kinds of direction vectors. Therefore, if the respective input signals R, G and B are correlated, the direction vectors of the respective signals will coincide or will be similar but, if they are not correlated, the direction vectors will not coincide or will not be similar. Therefore, it is a basis that, when the respective signals are compared with the above mentioned coded output signals by a comparing means 4 and are further quantified by a quantifying means 5, the size of the movement quantity will be able to be detected and will be able to be output as a movement quantity detecting signal 9 from an output end 8.

Now, in detecting the movement quantity as synchronized with a video signal, the detection by a frame and the detection by a field are considered. In case the movement quantity is imaged as a frame signal, except a special case, the detection by the frame and the detection by the field are equal. In such case, the first field and second field will be correlated so much that the bands included in .the signals will be substantially equal. Therefore, the band is detected by a band detecting means 6 in the first field, thereby signal passing bands of the coding means 3a, 3b and 3c are set by a frequency characteristic varying signal 7, this band limit is applied to the signal of the second field and the movement can be detected on the basis of this signal.

Here, for the explanation, the input signals are made R, G and B. However, the combination of input signals is not limited to this and the same also in the following explanation.

Figure 3:
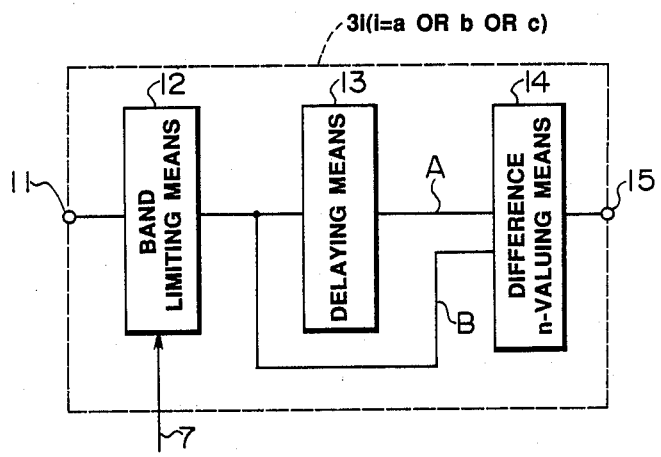

FIG. 3 shows a concrete block formation of the above mentioned coding means 3a, 3b or 3c (represented by 3i wherein i=a, b or c) applied to detect a movement in the horizontal direction or vertical direction.

An R, G or B image signal as an input signal is input into a band limiting means 12 through an input end 11, has the band limited as predetermined by this band limiting means and is input into a difference n-valuing means 14 with one side through but with the other side not through a delaying means 13. This delaying means 13 is to delay the signal by one sample period. Two input signals of the delayed signal A and the image signal B not delayed are input into a difference n-valuing means 14 and are compared with each other, are n-valued as a result in decoded type or encoded type and are output. The output signal is input into a comparing means 4 through an output end 15.

Figure 4:
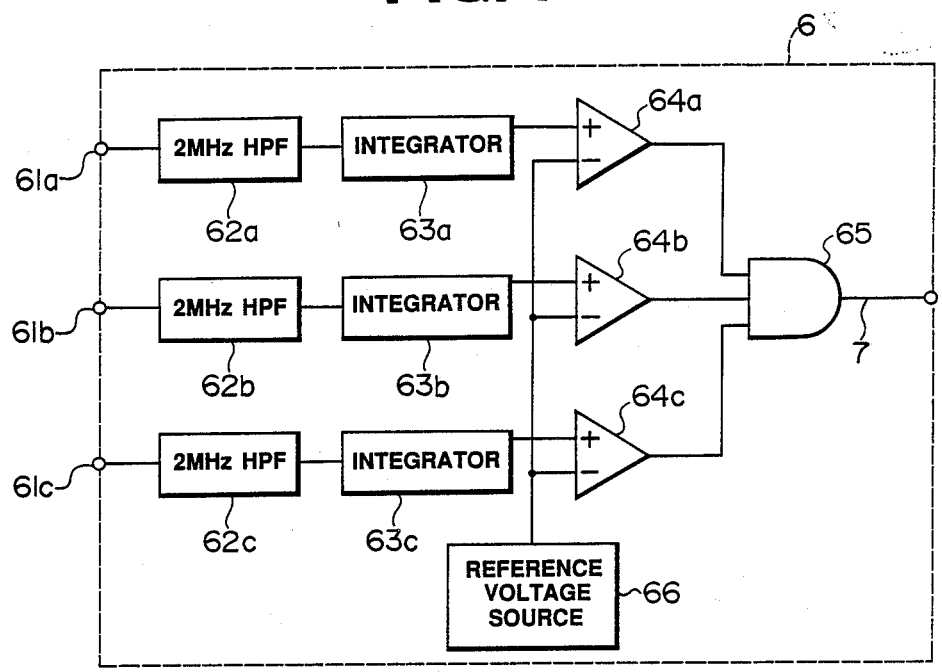

In FIG. 4, in a band detecting means 6, when respective R, G and B signals are input respectively through input ends 61a, 61b and 61c, a properly determined cutoff frequency will be input into fixed high pass filters (abbreviated as HPF and mentioned in FIG. 4 as of 2 MHz for the explanation) 62a, 62b and 62c. Thereby, the high band components of the respective signals will pass, will be input respectively into integrators 63a, 63b and 63c, will be integrated for the first field period as described above, will be quantified and will be input respectively into comparators 64a, 64b and 64c. In the comparators 64a, 64b and 64c, a comparing voltage is given by a reference voltage source 66 and is compared with the outputs from the integrators 63 (representing 63a, 63b and 63c). Here, in case the output voltages from the integrators 63 are higher than the comparing voltage, the outputs of the comparators 64 (representing 64a, 64b and 64c) will be on a high level. On the contrary, in case the output voltages from the integrators 63 are lower than the comparing voltage, the outputs of the comparators 64 will be on a low level. The outputs of the comparators 64 will be on a high level in case the frequency component above 2 MHz is much but, on the contrary, will be on a low level in case the frequency component above 2 MHz is little.

The outputs of the comparators 64 are input into a logical product circuit 65 of three inputs. This logical product circuit 65 will be on a high level in case all the outputs of the compators 64 are on a high level, that is, in case the frequency component above 2 MHz is much contained in the respective signals. By the high level output of the logical product circuit 65, the cutoff frequency of a band limiting means 12 is set to be properly higher than 2 MHz such as to be of 4 MHz or not limited. Also, in case the output of the theoretical product circuit 65 is on a low level, the cutoff frequency of the band limiting means 12 will be set at 2 MHz.

Here, for the convenience of the explanation, the cutoff frequency of the HPF 62 is made 2 MHz but is not limited to this frequency.

Figure 5:
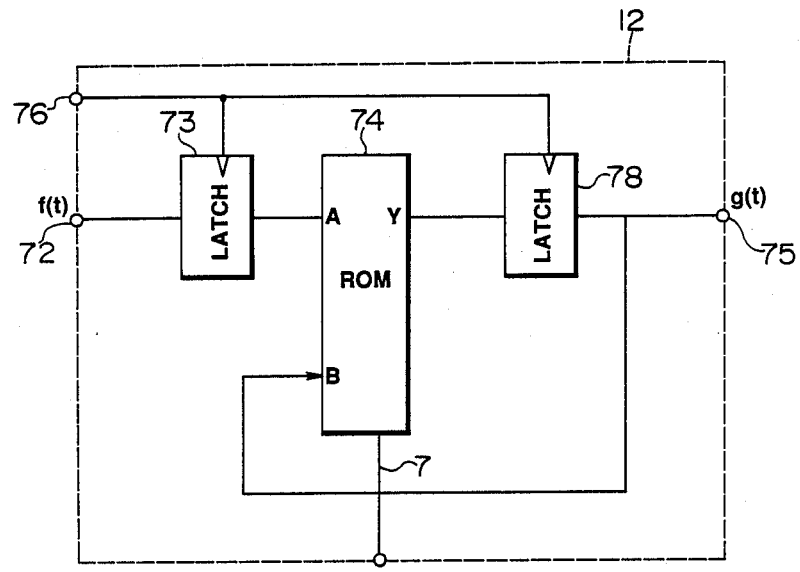
Figure 6A:
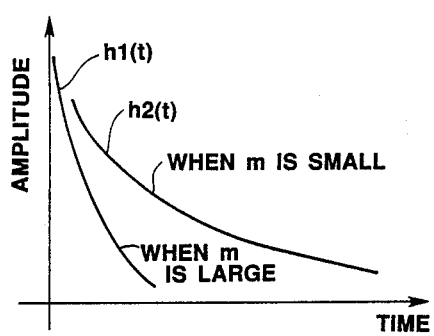
FIGS. 6a and 6b show explanatory diagrams showing output characteristics of the band limiting means.
Figure 6B:
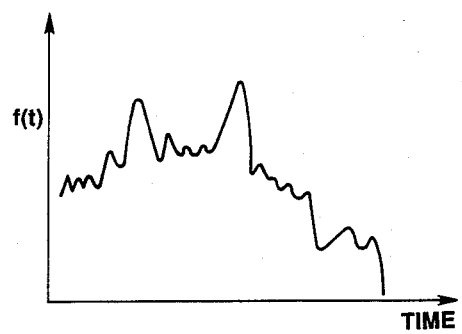

In FIG. 5, in the band limiting means 12 forming the coding means 3i, data f(t) are input into an input end 72 and a sampling clock is applied to a sampling clock input terminal 76. The input data f(t) are latched by a latch 73 and are input into an A input terminal of an ROM 74. In this case, an output before one clock has been fed back to a B input terminal of the ROM 74. The ROM 74 is so programed that, where m is a real number larger than 1, the data input into the A input terminal may be multiplied by $(m-1)/m$, the data input into the B input terminal may be multiplied by $1/m$ and the sum of this $(m-1)/m \times A$ and $1/m \times B$ may be output from the Y output terminal. Therefore, if the output is made g(t) against f(t) of the data input, $$g(t) = ((m-1)/m)f(it) + (1/m)g(t)$$

The data output from the Y output terminal are latched by a latch 78 by the same clock as of the latch 73 and are output from a data output terminal 75.

The operation by the ROM 74 is of a circulating type low pass filter (which shall be abbreviated as a circulating type LPF hereinafter) 77 itself. By properly selecting a coefficient m, the folding function can be made to correspond to such characteristic as is shown by the impulse response of h1(t) or h2(t) in FIG. 6(a). Therefore, the output g(t) can be obtained as an approximate value of the folding integration of h1(t) or h2(t) and f(t) of FIG. 6(b):

$$g(t) \approx \int_o^t f(\tau) h(t - \tau) d\tau$$

From the above, in case the cutoff frequency of the circulating type LPF 77 is to be elevated, it may be directed by the frequency characteristic varying signal 7 to enlarge the value of m but, on the contrary, in case the cutoff frequency is to be lowered, it may be directed by the frequency characteristic varying signal 7 to make the value of m small.

Figure 7:
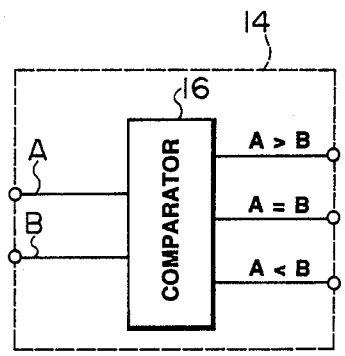

FIG. 7 shows the formation of the above mentioned difference n-valuing means 14. Two signals A and B input into this difference n-valuing means 14 are compared in a comparator 16 and signals of A>B, A=B and A<B are output in a decoded type from three output ends.

Figure 8:
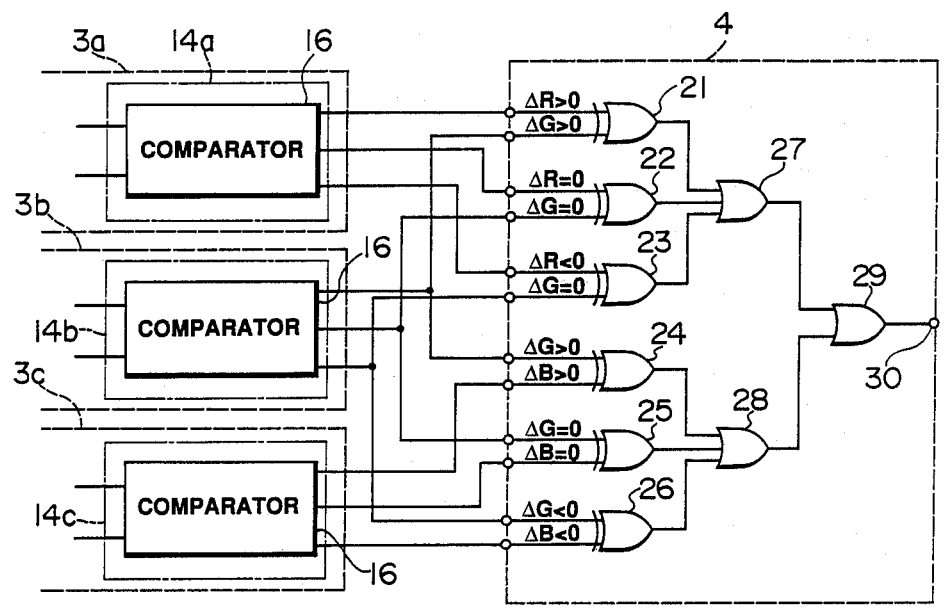

Next, the concrete formation of the comparating means 4 is shown in FIG. 8.

In this case, the input signal is a difference 3-valuing signal of the coded type shown in FIG. 7. That is to say, A>B, A=B and A<B in FIG. 7 correspond respectively to $\Delta R>0$ (or $\Delta G>0$ or $\Delta B>0$), $\Delta R=0$ (or $\Delta G=0$ or $\Delta B=0$) and $\Delta R<0$ (or $\Delta G<0$ or $\Delta B<0$) and the $\Delta R$, $\Delta G$ and $\Delta B$ represent differences of the respective signals.

Respective exclusive logical sums, that is, of whether they coincide or not are detected by respectively passing $\Delta R>0$ and $\Delta G>0$ through an exclusive logical sum (EX-OR hereinafter) circuit 21, passing $\Delta R=0$ and $\Delta G=0$ through an EX - OR circuit 22, passing $\Delta R<0$ and $\Delta G<0$ through an EX - OR circuit 23, passing $\Delta G>0$ and $\Delta B>0$ through an EX OR circuit 24, passing $\Delta G=0$ and $\Delta B=0$ through an EX - OR circuit 25 and passing $\Delta G<0$ and $\Delta B<0$ through an EX - OR circuit 26, logical sums are taken by passing these respectively through logical sum circuits (OR circuits) 27 and 28 of three inputs, a logical sum is taken by further passing them through an OR circuit 29 of two outputs, the correlation between the respective signals is determined and they are output to the quantifying means 5 from the output end 30. Here, any one circuit among the EX OR circuits 21, 22 and 23 and any one circuit among the EX - OR circuits 24, 25 and 26 are not always necessary. (BY the way, in FIG. 8, the difference n-valuing circuits 14 formed by using the comparator 16 in FIG. 7 are represented respectively by 14a, 14b and 14c.)

Figure 9:
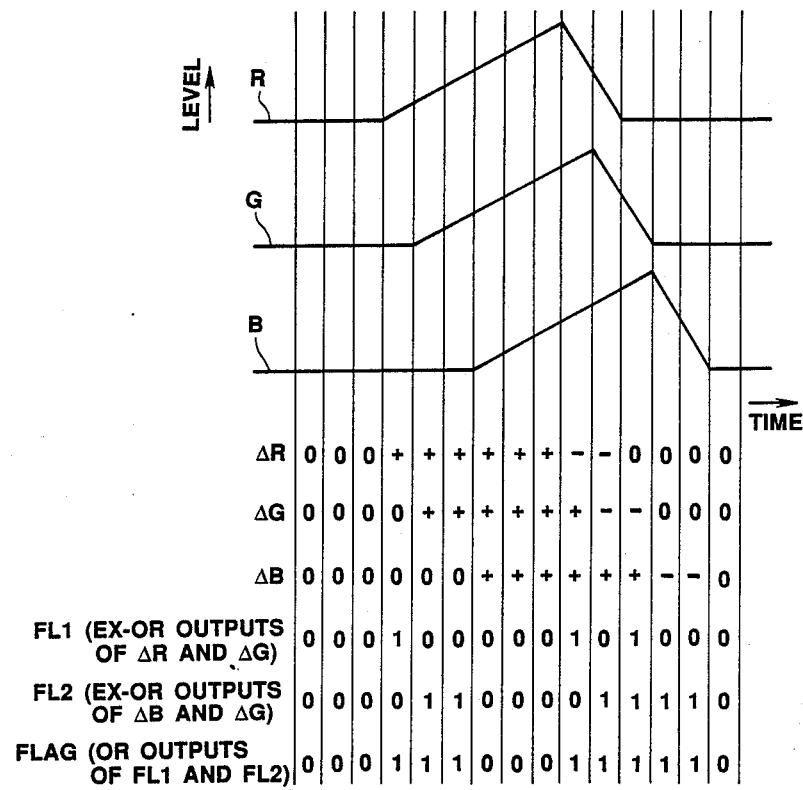

The manner of the correlation detection in the above mentioned comparing means 4 is visibly shown as in FIG. 9.

As shown in FIG. 9, the level of the image signals R, G and B on the ordinate varies with the time on the abscissa. That is to say, when a movement is produced, the difference 3-valuing signals (represented by +, 0 and − for convenience sake) at predetermined sampling intervals will be as shown on the right side of the respective $\Delta R$, $\Delta G$ and $\Delta B$. Therefore, the outputs of the OR circuits 27, 28 and 29 in FIG. 8 will be as shown respectively by FL1, FL2 and FLAG in FIG. 9. Here, as clear by comparing FL1 and FL2 with each other, it is found that, the larger the movement quantity, the longer the output period of the level of the OR circuits 27 and 28.

Figure 10:
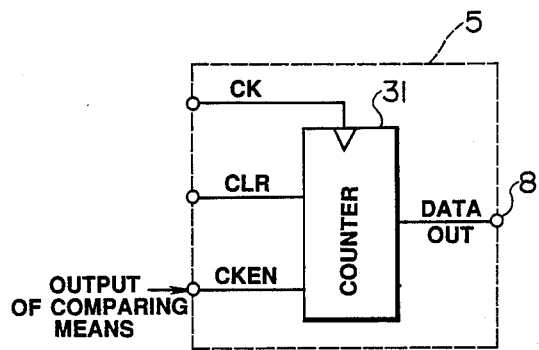

FIG. 10 shows a formation example of the quantifying means 5 formed of a counter 31. The output of the comparing means 4 is applied to a clock enabling terminal (CKEN) of the counter 31. When predetermined clocks CK from a clock generator not illustrated are counted, signal data quantified in response to the movement quantity will be obtained at the output end 8. By the way, a pulse in response to the period of the image signal to be correlated is applied to a clear terminal CLR. If a vertical synchronous pulse is applied, for example, at the end of the second field, the movement quantity will be quantified between the frames.

Figure 11:
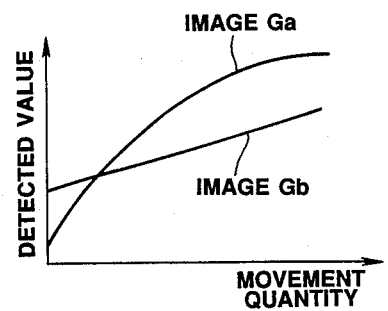

According to the above mentioned first embodiment, a movement detecting circuit hard to be influenced by the contents (such as an APL, tone and frequency component) of the image can be realized. For example, the relations between the movement quantity and detected value for an image Ga having the edge definitely found and an entirely flat image Gb are as shown in FIG. 11. Both images Ga and Gb can be confirmed to show that the detected value tends to uniformity increase with the increase of the movement quantity. This first embodiment can be applied to such signal processing apparatus wherein the size of the movement quantity of an image signal can be quantified at a high precision and the movement information is utilized.

Figure 12:
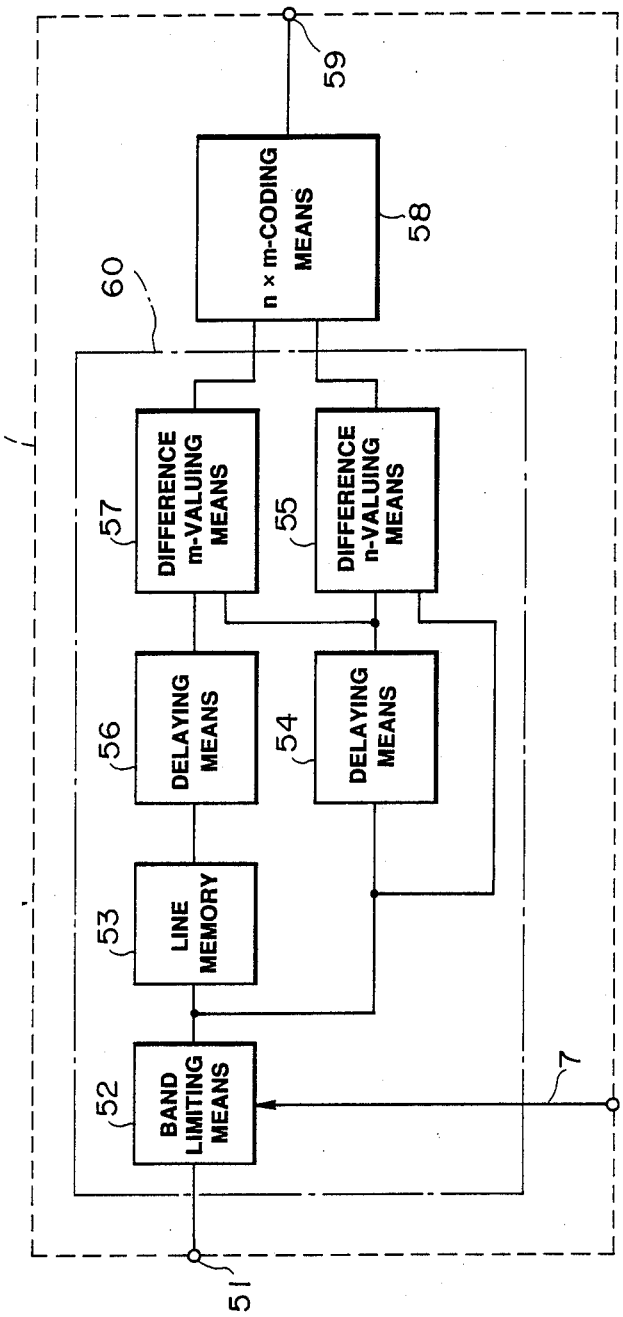
FIG. 12 relates to the second embodiment of the present invention and is a formation diagram of a coding means.

FIG. 12 shows the second embodiment of the present invention.

Whereas the coding means 4 in FIG. 3 detects the movement in either of the horizontal direction and vertical direction, the coding means 50 in FIG. 12 shows a concrete formation in the case of detecting the movement in the horizontal direction and vertical direction.

An image signal is input into a band limiting means through an input end 51, has the band limited as predetermined in this band limiting means 52 and is input into a line memory 53, delaying means 54 and difference n-valuing means 55. The signal delayed by a predetermined horizontal line period by the line memory 53 is delayed by a delaying means 56, has the delay corrected with the output of the above mentioned delaying means 54 and is then input into a difference m-valuing means 57.

The signal delayed by one sample period by the above mentioned delaying means 54 is input into the difference n-valuing means 55 and difference m-valuing means 57. The difference n-valuing means 55 compares two signals approaching in the horizontal direction at the intervals of the above mentioned one sample period, n-values the difference in a decoded type or encoded type and outputs it to an n×m coding means 58. At the same time, the difference m-valuing means 57 compares two signals approaching in the vertical direction at the above mentioned predetermined horizontal line intervals, m-values the difference in a decoded type or encoded type as a result and outputs it to an n×m coding means 58.

The outputs of the above mentioned difference n-valuing means 55 and difference m-valuing means 57 are conceptionally considered to be made by approximating the partial differential outputs in the horizontal direction and vertical direction of the input signal respectively with n kinds and m kinds of direction vectors.

Therefore, it can be considered that, by combining these two outputs, the gradients at the respective sample points of the input signal are approximated with n×m kinds of direction vectors. This combination is made by the n×m coding means 58 and is output to the comparing means 46 (which may be 4 in FIG. 2) through an output terminal 59.

Figure 13:
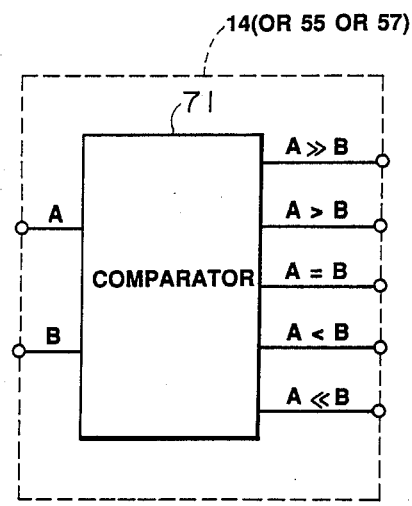
FIGS. 13 and 14 are diagrams showing the formations of other difference n (or m)-valuing means.
Figure 14:
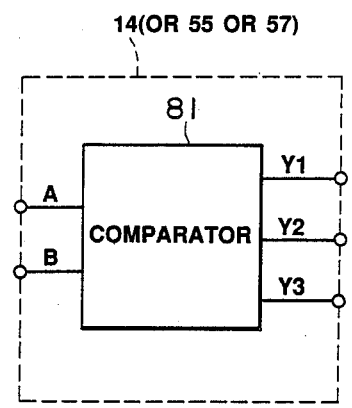

FIGS. 13 and 14 show other formation examples of the difference n (or m)-valuing means 14 in FIG. 3. Also, this means can be used as the difference n-valuing means 55 and difference m-valuing means in FIG. 12.

FIG. 13 shows a comparator 71 which 5-values the difference by using an ROM or PLD and outputs five values of $A>>B$, $A>B$, $A=B$, $A<B$ and $A<<B$ in a decoded type.

In this formation example, the threshold values respectively of $A>>B$ and $A>B$ and of $A<<B$ and $A<B$ can be optionally selected.

In FIG. 14, a 5-valued output is output in an encoded type by using a comparator 81 and encoded outputs Y1, Y2 and Y3 are output against inputs A and B. The relations between the input and output in this case are as in Table 1.

TABLE 1

|  | Y1 | Y2 | Y3 |
|---|---|---|---|
| $A >> B$ | 1 | 1 | 0 |
| $A > B$ | 1 | 0 | 0 |
| $A = B$ | 0 | 0 | 0 |
| $A < B$ | 0 | 0 | 1 |
| $A << B$ | 0 | 1 | 1 |

Figure 15:
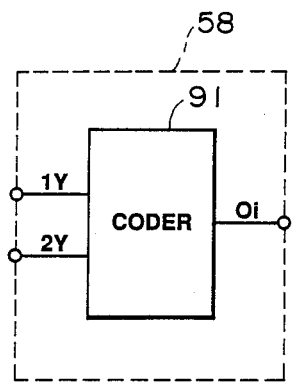
FIG. 15 is a diagram showing the formation of an n×m coding means.

FIG. 15 shows a formation example of the n×m coding means 58 (shown in FIG. 12).

This n×m coding means 58 forms a coder 91 by using an ROM or PLD and realizes, for example, a 3×3 coding means. The relations between the input and output of this coder 91 are shown in Table 2. Here, the outputs 01 to 09 may be in either of a decoded type and encoded type.

Figure 16:
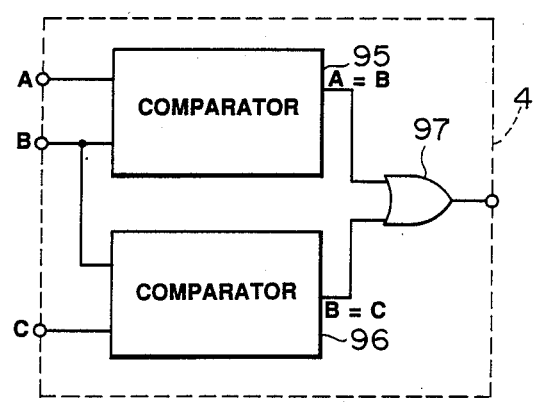
FIG. 16 is a diagram showing the formation of another comparing means.

FIG. 16 shows a formation example of the comparing means 4. In FIG. 7, the input is a difference 3-valuing signal of a decoded type but this embodiment is an example of the case that the input is a difference n-valuing signal an encoded type and is formed of two comparators 95 and 96 and an OR circuit 97 for input signals A, B and C.

TABLE 2

| | 2Y | | |
|---|---|---|---|
| 1Y | $C > D$ | $C = D$ | $C < D$ |
| $A > B$ | 01 | 02 | 03 |
| $A = B$ | 04 | 05 | 06 |
| $A < B$ | 07 | 08 | 09 |

By the way, the movement detecting circuit of the present invention is based on a differential operation, is therefore confirmed to show against the focus dulling the tendency that the larger the dulling, the larger the detected value and can be applied as a dulling detecting circuit.

By the way, the principle of detecting the movement shown here can be applied to either digital or analogue signal form.

Figure 17:
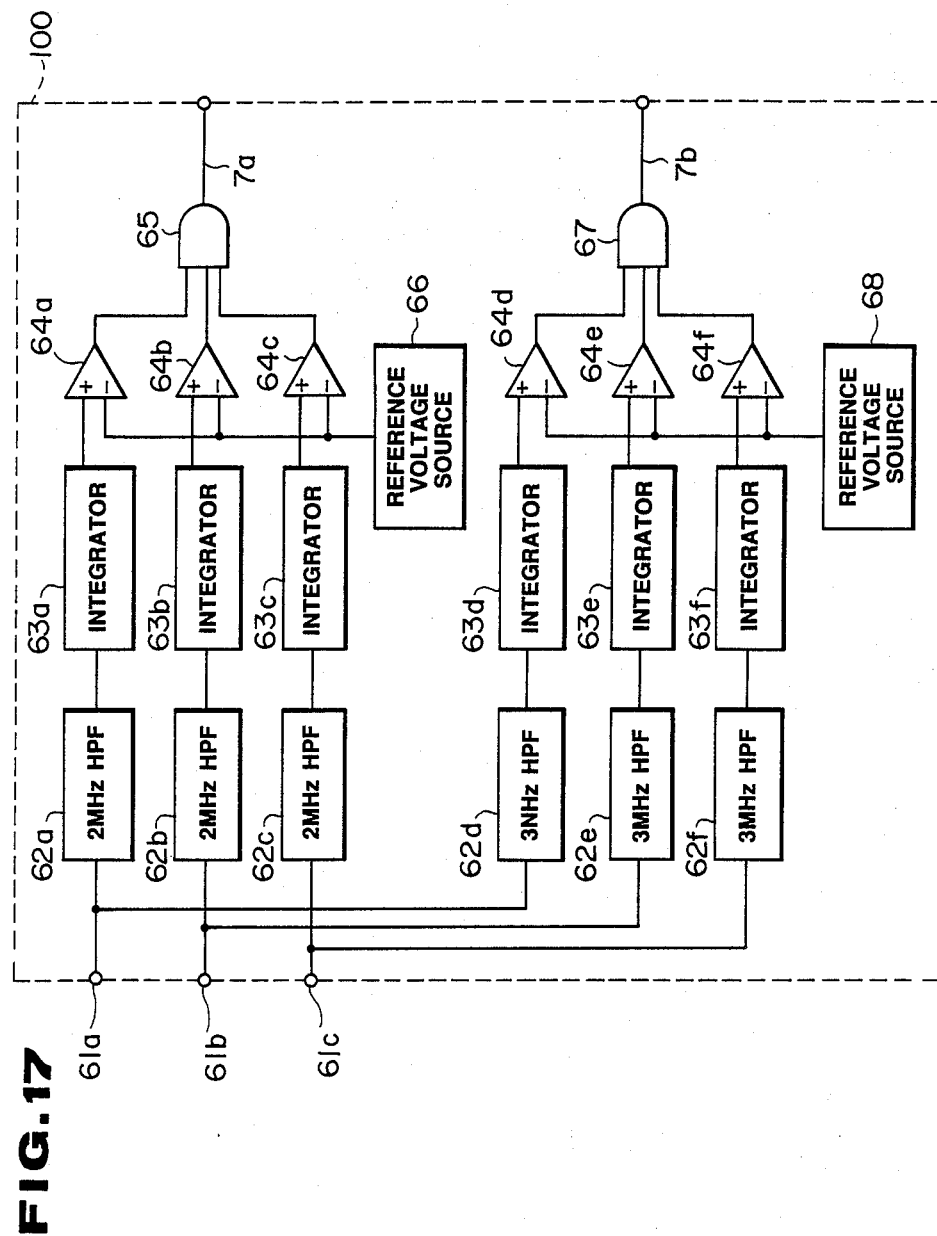
FIG. 17 is a diagram showing the formation of another band detecting means.

FIG. 17 is a diagram of the band detecting means 6 in FIG. 4 in the first embodiment as shown in the formation by another method.

In FIG. 17, two band limiting means having the formation shown in FIG. 4 are arranged in parallel and, in place of the HPF's of 2 MH$_z$ of one band limiting means, HPF's 62d, 62e and 62f of a cutoff frequency of 3 MH$_z$ are arranged to form a band limiting means 100. Thereby, though, in FIG. 4, the bands could be discriminated in only two kinds of above and below 2 MH$_z$ here they can be discriminated in three kinds of below 2 MH$_z$ above 2 MH$_z$ and below 3 MH$_z$ and above 3 MH$_z$ and the movement detecting precision can be elevated.

Here, the frequency characteristic varying signals for the band limiting means 12 are 7$a$ and 7$b$ and the value of the coefficient m can be designated by the input of an encoded type.

Figure 18:
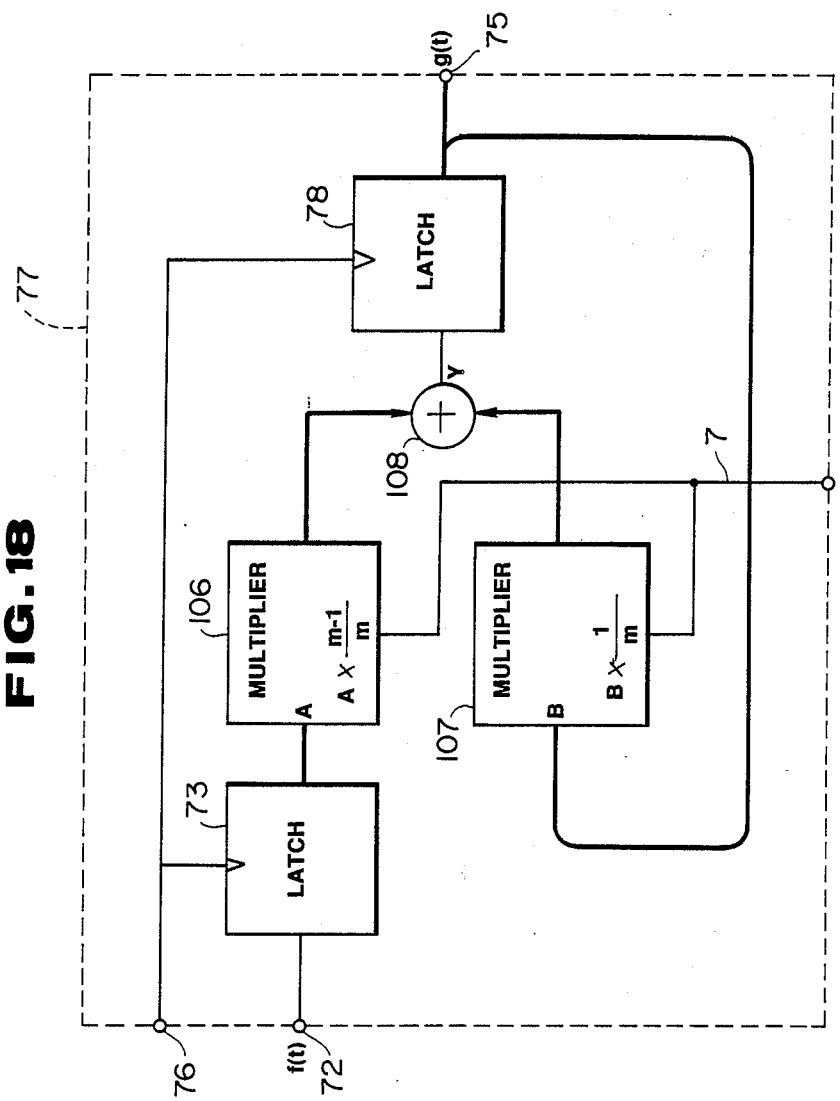
FIG. 18 is a diagram showing the formation of another circulating type LPF.
Figure 19:
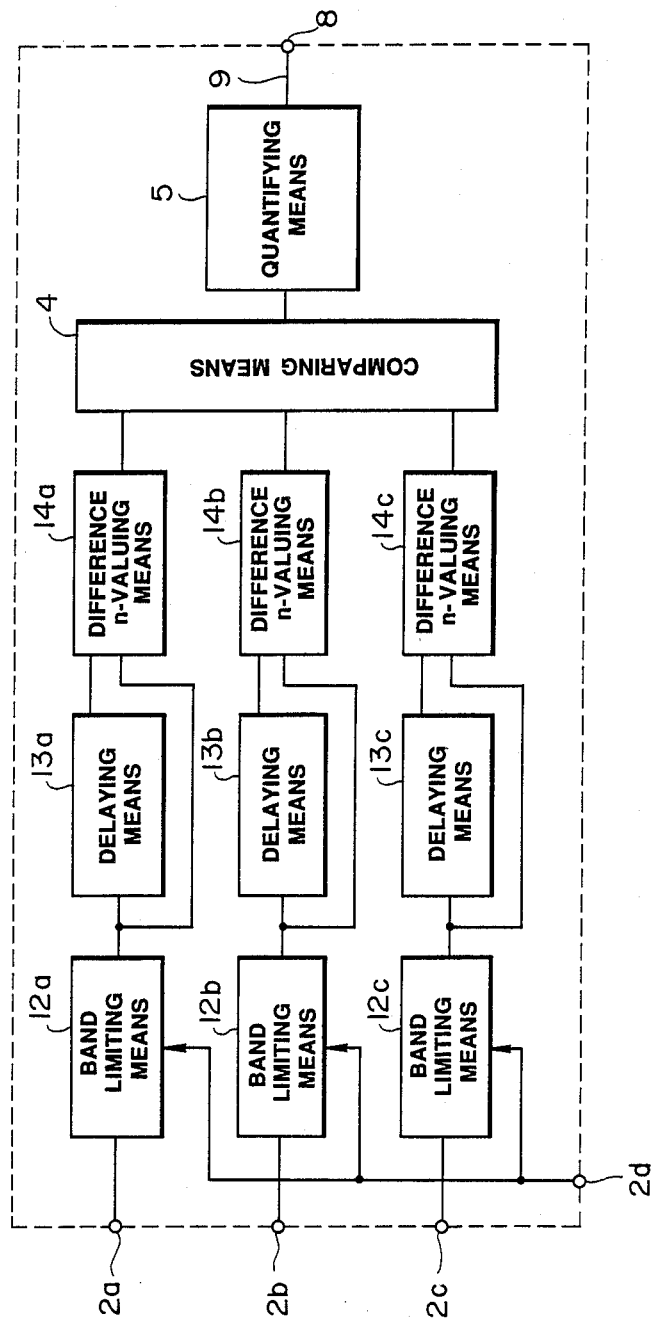
FIG. 19 is a formation diagram of a frequency characteristic statically switching movement detecting circuit.

FIG. 18 is a formation diagram showing another formation of the circulating type LPF 77 in FIG. 5 in the first embodiment.

In the formation in FIG. 5, the product and sum are operated once but, when the data word length (that is, the number of bits of the data) becomes large, the addresses of the ROM 74 will become short in some case. Therefore, in FIG. 18, the product and sum operation:

$$Y=((m-1)/m)A+(1/m)B \; m>1$$

is made by multipliers 106 and 107 and an adder 108.

Thereby, even if the data word length becomes large to some extent, it will be able to be coped with.

Also, in case the object is limited in several kinds and respective bands are anticipated, it will be sufficient that, by the manual operation from an electronic endoscope or in response to the kind of the endoscope being used, as in FIG. 9, the frequency characteristics of the band limiting means 12 may be input into the band limiting means 12 through a switch input end 2$d$ from a manual switch or static operatively connected switch not illustrated.

FIG. 20 shows an amplitude adjusting circuit 105 wherein a means for making the amplitude of the detected signal substantially coincide is provided in the step before the movement detecting circuit to improve the detecting precision.

An analogue chrominance signal R input into an input end 106$a$ of the amplitude adjusting circuit 105 is input into a gain controlling amplifier 107, has the gain varied by a signal applied to a gain controlling end and is input into the movement detecting circuit 1 as a chrominance signal R′ having had the amplitude of the input signal R varied. This chrominance signal R′ is input into an integrating circuit 108, is integrated by one frame/field period, is then input into a sample holding circuit 109 and is input into a differential amplifier 111 holding the integrated values after respective frame/field periods.

On the other hand, an analogue chrominance signal G input through an input end 106$b$ is input into a differential amplifier 111 through an integrating circuit 112 and sample holding circuit 113, the difference signal of the two input integrated values is determined and a signal of the average voltage difference of the chrominance signals R and G is produced through a low pass filter 114. The signal passed through this low pass filter 114 is input into the gain controlling amplifier 107, the gain of the chrominance signal R is controlled by this signal and the amplitude of the chrominance signal R′ output from this amplifier 107 is aproximated to the amplitude of the chrominance G.

That is to say, generally, when the two signals R and G different in the amplitude are passed through this amplitude adjusting circuit 105 as a preprocess for detecting the movement, the amplitudes of both signals will be substantially arranged and therefore the movement will be able to be detected at a higher precision.

By the way, in FIG. 20, the input signals are the synchronized chrominance signals R and G but any two signals can be selected from among other chrominance signals, luminance signals and color difference signals. This embodiment can be applied also to the case of detecting the movement in three or more signals.

As described above, according to the present invention, for respective pixel signals to have the movement detected, other images have the band limited in the lowest image band of the compared image signals, a difference signal of the pixels approaching at a predetermined sample period is determined, images n-valued and having the movement detected are compared, the compared output signal is quantified and therefore the size of the movement quantity of the image signal can be quantified at a high precision.

What is claimed is:

1. A movement detecting circuit comprising:
    a difference signal producing means for producing a difference signal of pixel signals approaching respective plural image signals representing images of an object imaged at different times;
    a correlation detecting means for detecting the correlation between the corresponding plural difference signals produced by said difference signal producing means;
    a quantifying means for quantifying the signal output detected by said correlation detecting means;
    a band detecting means for detecting the signal components of said plural image signals; and
    a band varying means for varying the band characteristics of the image signals input into said difference signal producing means by the output signal of said band detecting means.

2. A movement detecting circuit according to claim 1 wherein said difference signal producing means has a delaying means for delaying the image signal by one or a plurality of horizontal periods.

3. A movement detecting circuit according to claim 1 wherein said band detecting means is a switch circuit.

4. A movement detecting circuit according to claim 1 wherein said signal band detecting means comprises a first high pass filter for passing a signal above a predetermined frequency for the respective image signals, a first integrating circuit for integrating by one field or frame the signal passed through said first high pass filter, a first comparator for judging whether the output signal of said first integrating circuit is above a reference voltage or not and a first logical product circuit for producing a logical product of the output of said first comparator.

5. A movement detecting circuit according to claim 4 wherein said signal band detecting means further comprises a second high pass filter for passing a signal above the frequency passed by said first high pass filter, a second integrating circuit for integrating by one field or frame period the signal passed through said second high pass filter, a second comparator for judging whether the output signal of said second integrating circuit is above the reference voltage or not and a second logical product circuit for producing a logical product signal of the output of said second comparator.

6. A movement detecting circuit according to claim 1 further having an amplitude adjusting means for approximating the amplitudes of said plural image signals with each other.

7. A movement detecting circuit according to claim 6 wherein said amplitude adjusting means comprises a pair of integrating circuits one of which integrates two image signals through a multiplier and the other of which integrates them through no multiplier, a pair of sample holding circuits for holding the outputs of said respective integrating circuits for one field or frame period and a subtracter for outputting difference signals for controlling the multiplying coefficients of said multipliers from the output signals of said pair of sample holding circuits.

8. A movement detecting circuit according to claim 1 wherein said band varying means is a circulating type low pass filter which can limit the size of a feedback coefficient by the output signal of said band detecting means.

9. A movement detecting circuit according to claim 8 wherein said circulating type low pass filter comprises a latch for holding an input signal, an ROM for inputting the signal held by said latch, multiplying said input signal by a coefficient, multiplying the output signal before one clock by a coefficient and adding the multiplied input signal and multiplied output signal and a latch for holding the signal output from said ROM.

10. A movement detecting circuit according to claim 8 wherein said circulating type low pass filter comprises a latch for holding an input signal, a multiplier for inputting the signal held by said latch and multiplying said input signal by a coefficient, an adder for receiving said multiplied signal, a latch for holding the signal from said adder and a multiplier for inputting the signal held by said latch, multiplying this input signal by a coefficient and outputting the multiplied signal to said adder.

* * * * *